May 23, 1939.  P. H. SMYTH, JR  2,159,834
PHONOGRAPH
Filed May 18, 1936  8 Sheets-Sheet 1

Inventor:
Paul H. Smyth Jr.
By Williams, Bradbury, McCaleb & Hinkle
Attys.

May 23, 1939.　　P. H. SMYTH, JR　　2,159,834
PHONOGRAPH
Filed May 18, 1936　　8 Sheets-Sheet 2
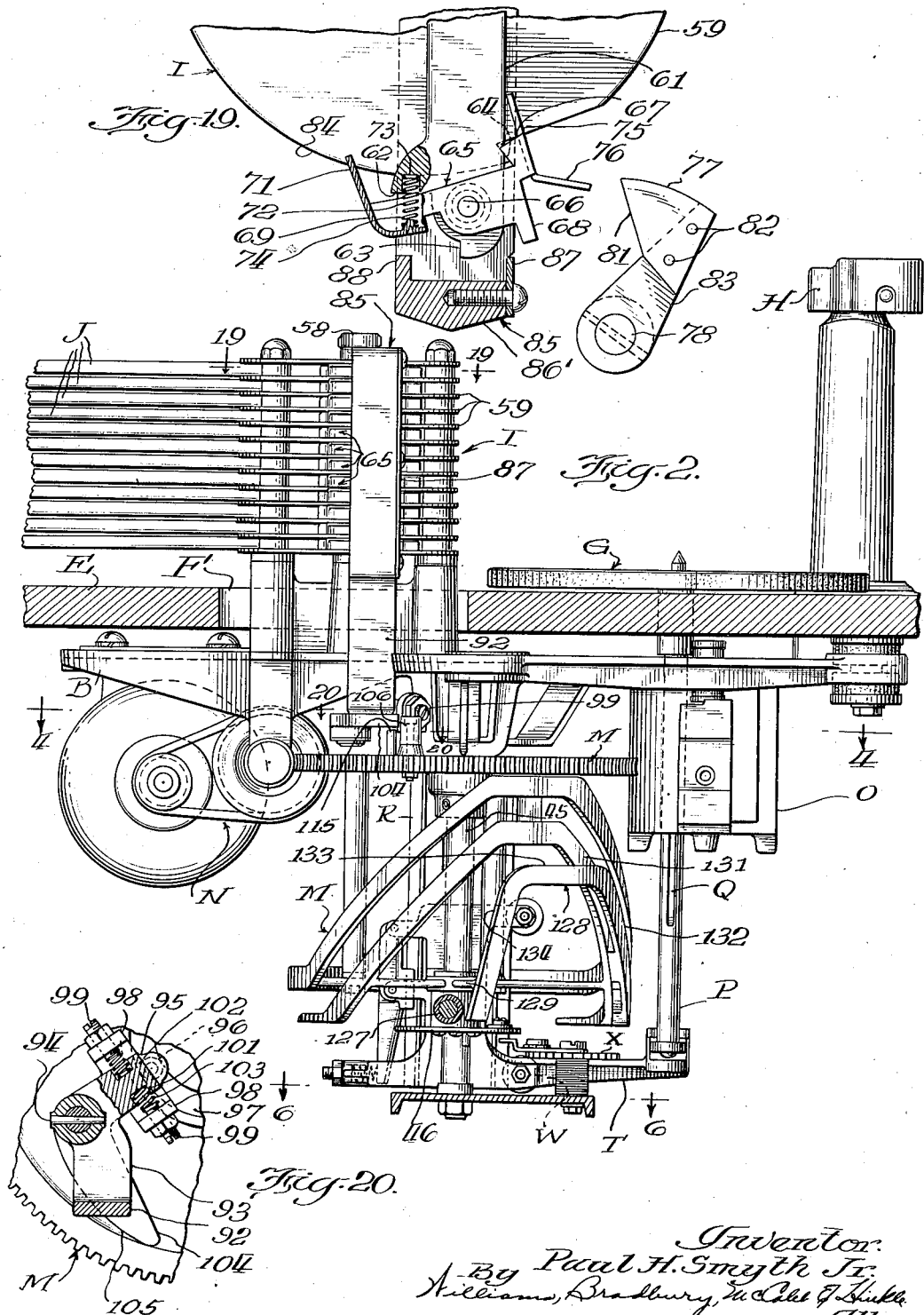

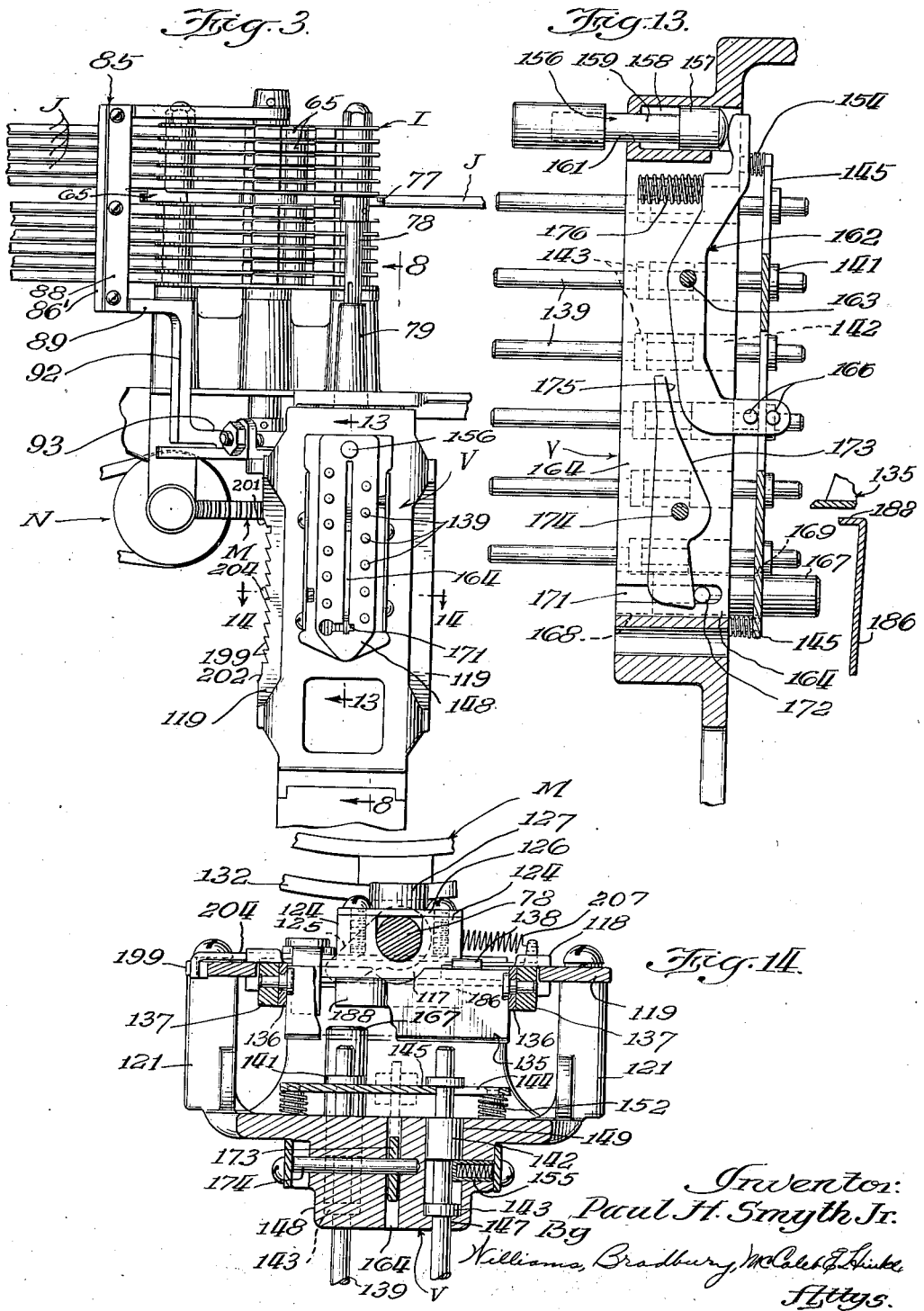

May 23, 1939.  P. H. SMYTH, JR  2,159,834
PHONOGRAPH
Filed May 18, 1936  8 Sheets-Sheet 4
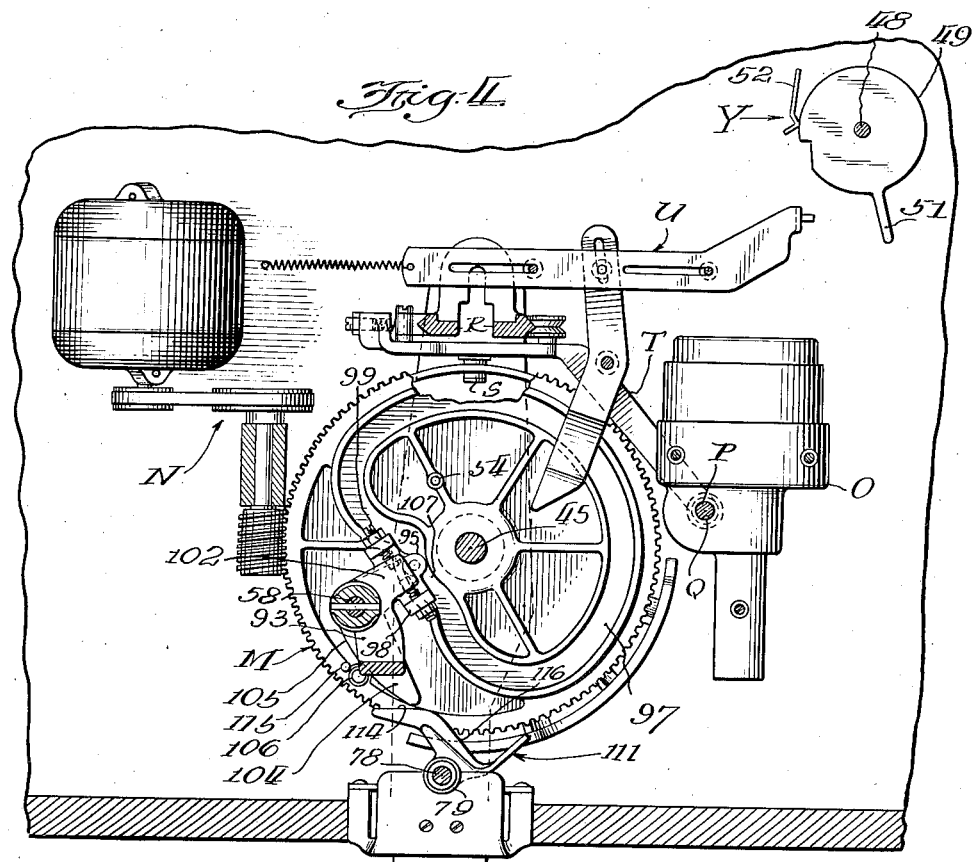
Fig. II.
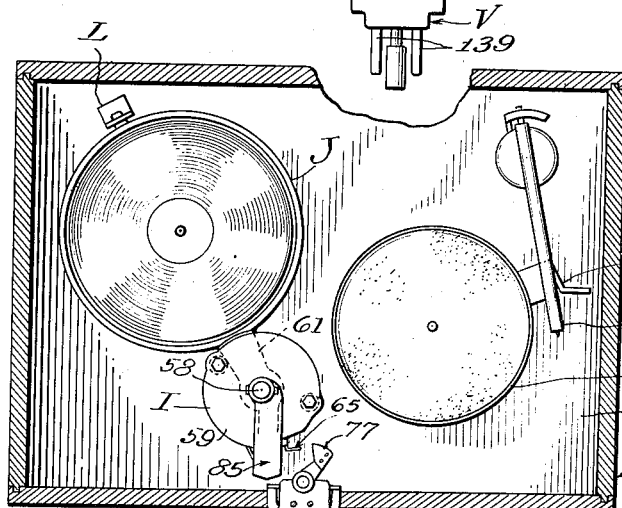
Fig. 5.
Inventor.
Paul H. Smyth Jr.
By Williams, Bradbury, McCaleb & Hinkle
Attys.

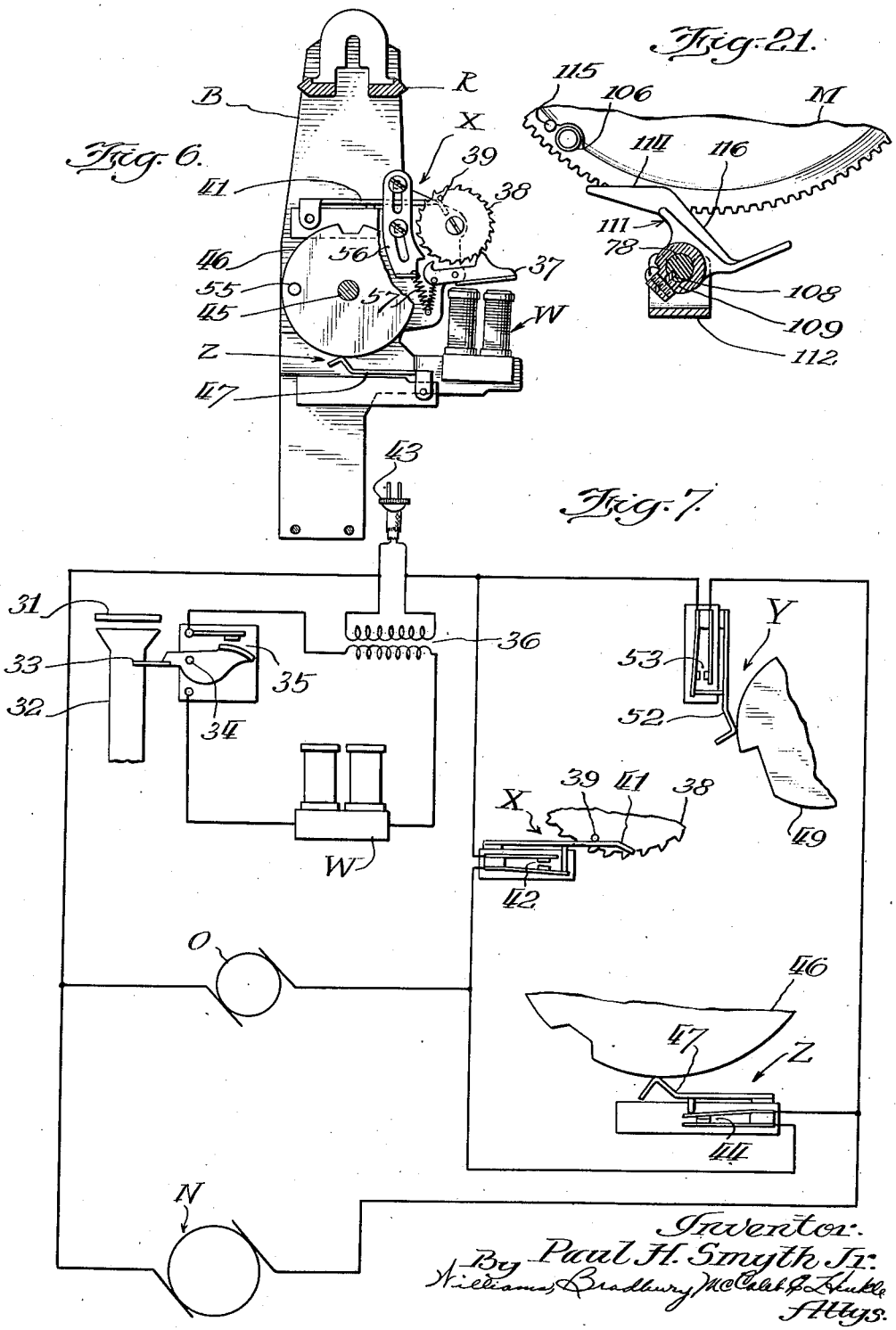

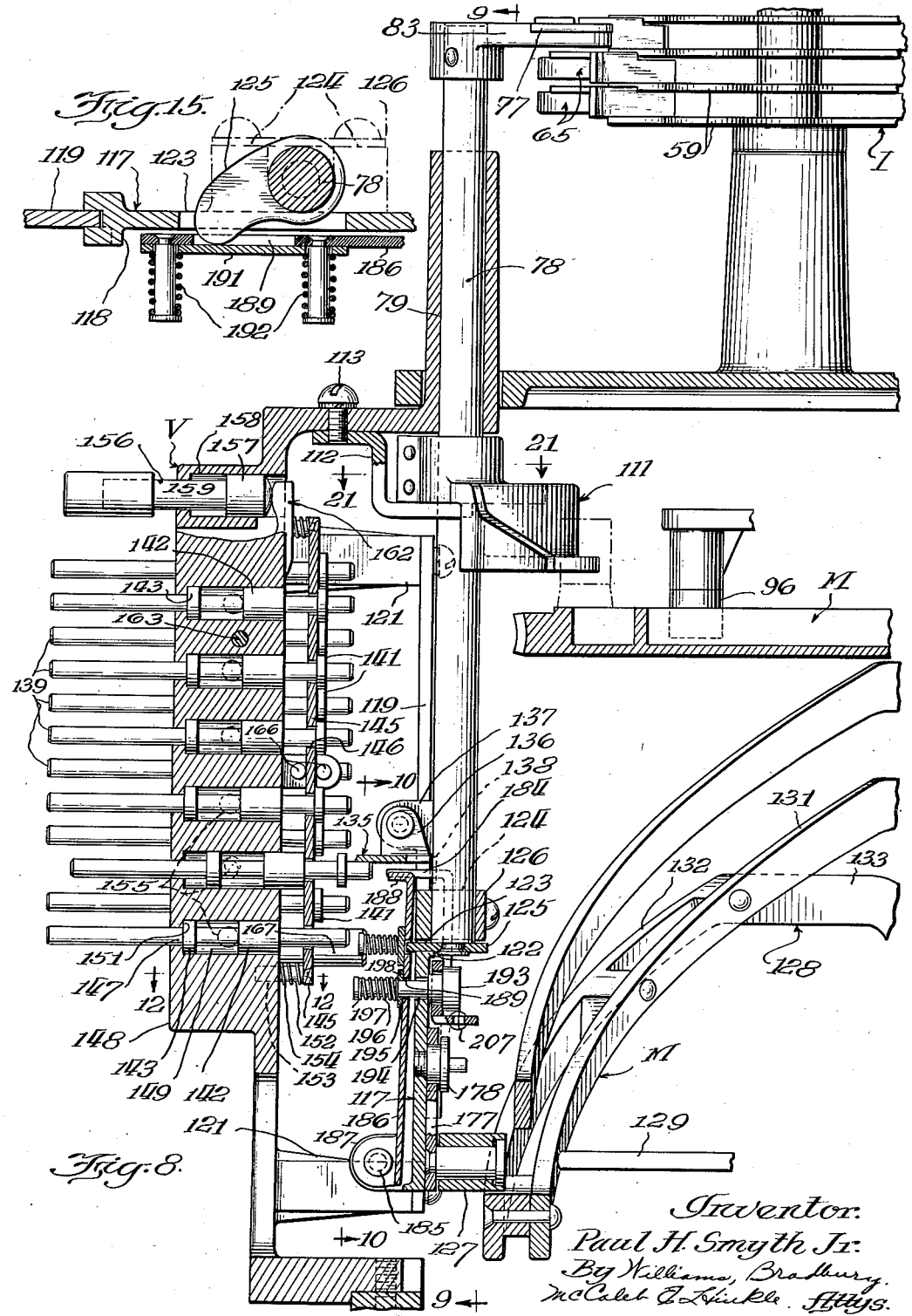

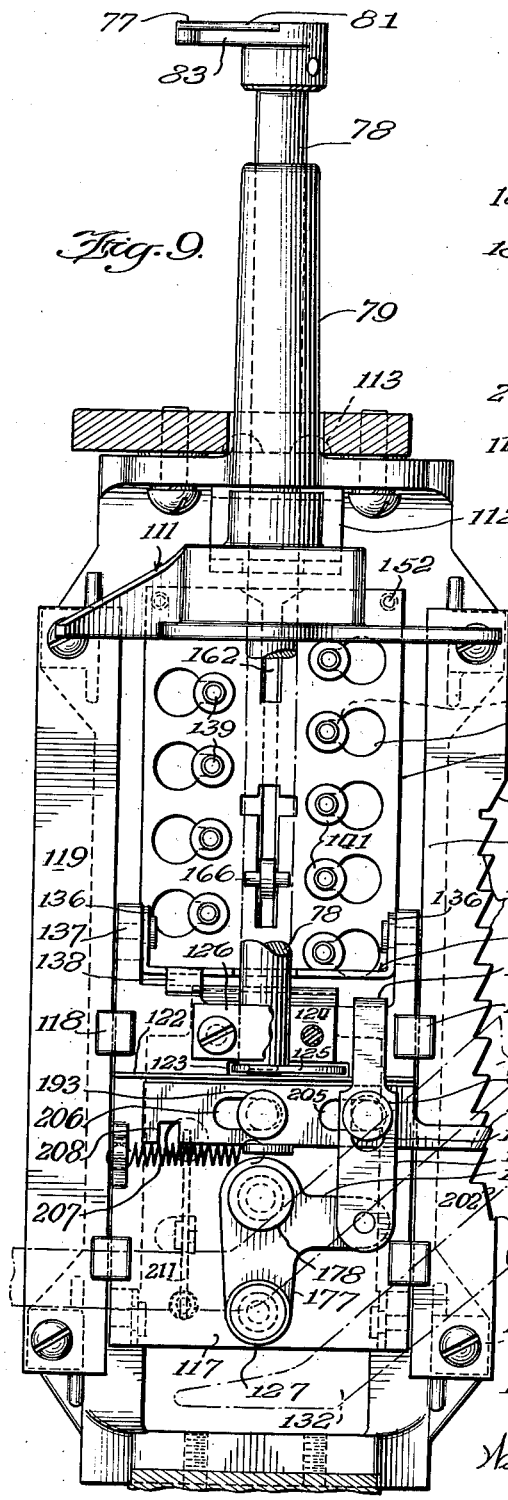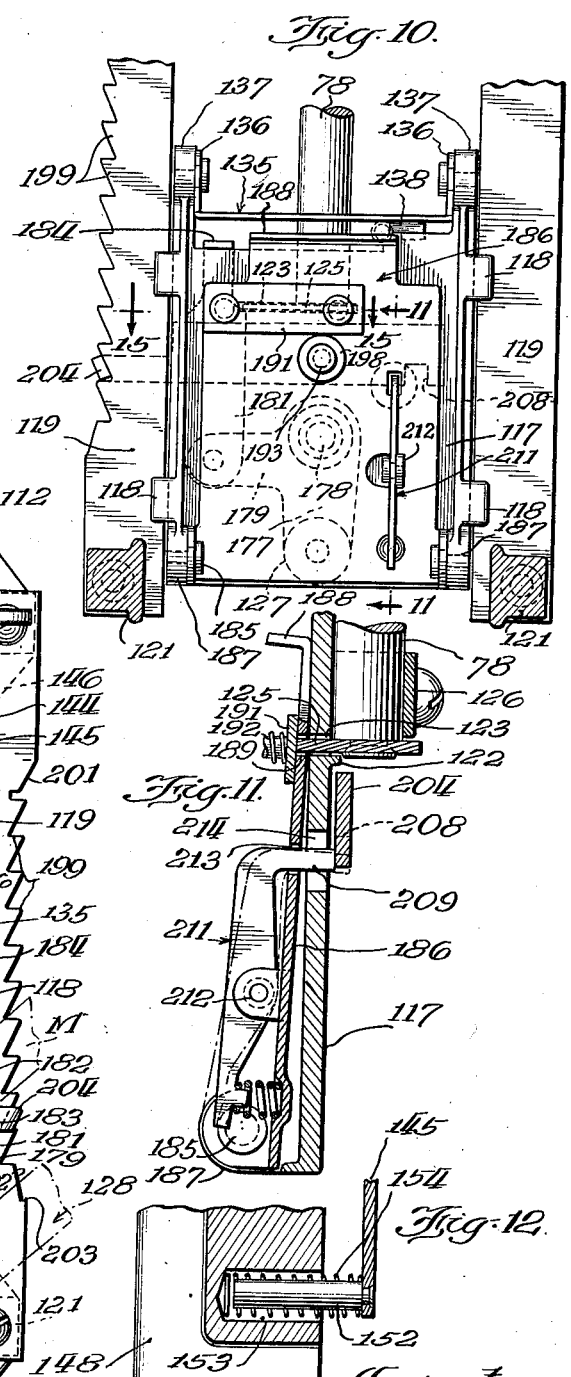

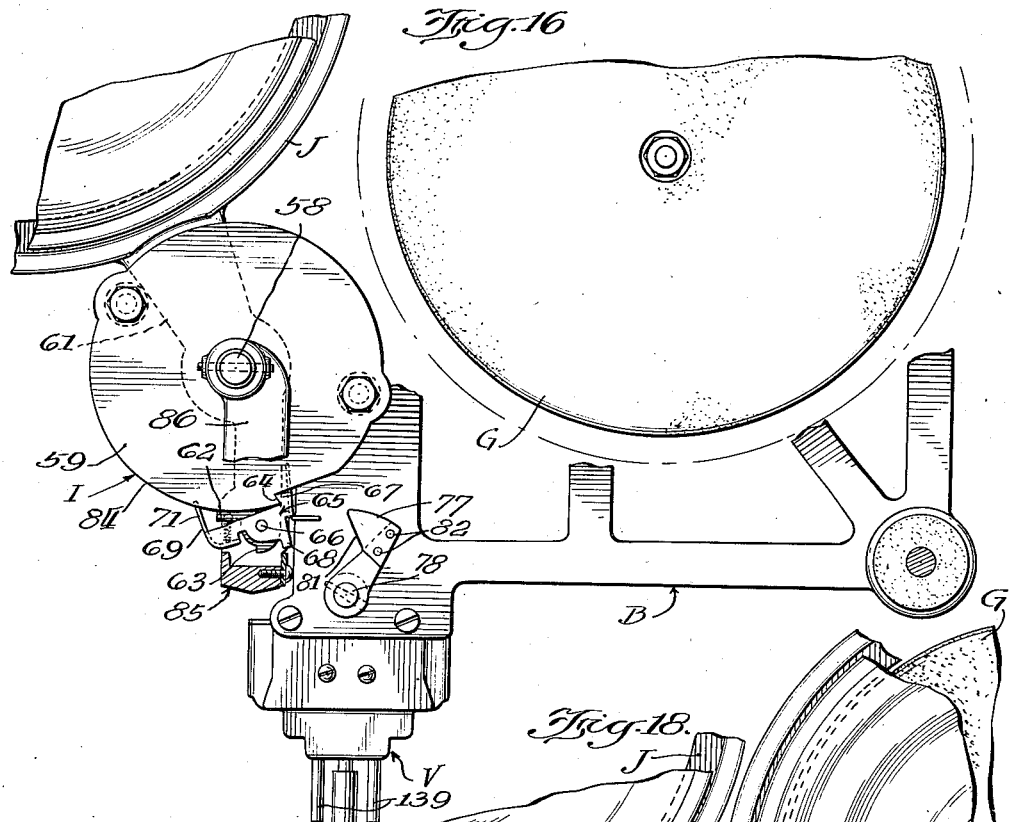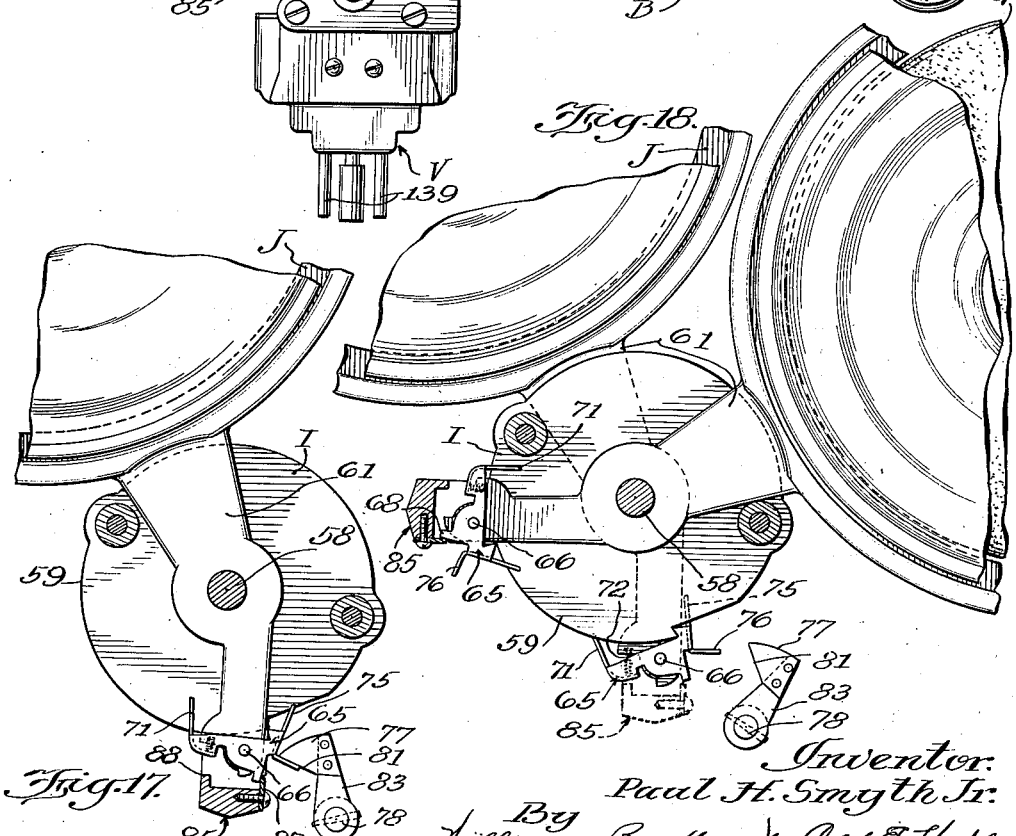

Patented May 23, 1939

2,159,834

UNITED STATES PATENT OFFICE 2,159,834

PHONOGRAPH

Paul H. Smyth, Jr., Evanston, Ill., assignor to Rock-Ola Manufacturing Corporation, Chicago, Ill., a corporation of Delaware Application May 18, 1936, Serial No. 80,251

18 Claims. (Cl. 274—10)

This invention relates to phonographs, and has for a general object the provision of a novel and an improved multi-record phonograph capable of playing a plurality of records in any desired sequence, that is to say, selectively, or some or all of the records in the order of their arrangement, that is to say, in a predetermined sequence.

Another object of the invention is the provision of generally simplified record changing apparatus for such phonograph, which is adapted to lock each record carrier in position at both ends of its travel to and from delivery position.

A further object of the invention is the provision of a plurality of record carrier latching members which are selectively or successively operable to release the record carriers and to couple the released record carriers with a swingable member for movement to and from record delivery positions.

Another object of the invention is the provision of a novel and improved selector and selector control for multi-record phonographs.

Other objects of the invention include the provision of the novel arrangements and combinations hereinafter disclosed and claimed, as illustrated in the accompanying drawings wherein like reference characters relate to corresponding parts throughout the several views, and wherein:

Fig. 2 is a fragmentary cross section taken substantially along the lines 2—2 of Fig. 1, but at a different scale;

Fig. 3 is a fragmentary front elevation of the novel record changing apparatus with a record carrier in delivery position;

Fig. 4 is a fragmentary cross section taken substantially along the lines 4—4 of Fig. 2;

Fig. 5 is a partial plan section taken substantially along the lines 5—5 of Fig. 1;

Fig. 6 is a detached plan view, partially in cross section, of a part of the control apparatus of the illustrated phonograph;

Fig. 7 is a schematic wiring diagram of the phonograph control apparatus;

Fig. 8 is a fragmentary cross section taken substantially along the lines 8—8 of Fig. 3;

Fig. 9 is a cross section taken substantially along the lines 9—9 of Fig. 8;

Fig. 10 is a cross section taken substantially along the lines 10—10 of Fig. 8;

Fig. 11 is a cross sectional detail substantially along the lines 11—11 of Fig. 10;

Fig. 12 is a cross sectional detail substantially along the lines 12—12 of Fig. 8;

Fig. 13 is a cross section taken substantially along the lines 13—13 of Fig. 3, but at a different scale;

Fig. 14 is a cross section taken substantially along the lines 14—14 of Fig. 3, but at a different scale;

Fig. 15 is a detail cross section taken substantially along the lines 15—15 of Fig. 10;

Fig. 16 is a fragmentary plan view, partially in section, of the phonograph apparatus in nonplaying position;

Fig. 17 shows a portion of the apparatus shown in Fig. 16 and illustrates the operation of releasing a record carrier and coupling is to a swingable member;

Fig. 18 is a view similar to that shown in Fig. 16 and shows the apparatus with a record carrier in delivery position;

Fig. 19 is a fragmentary cross section taken substantially along the lines 19—19 of Fig. 2;

Fig. 20 is a fragmentary detail section taken substantially along the lines 20—20 of Fig. 2; and Fig. 21 is a detail cross section taken substantially along the lines 21—21 of Fig. 8.

Figure 1:
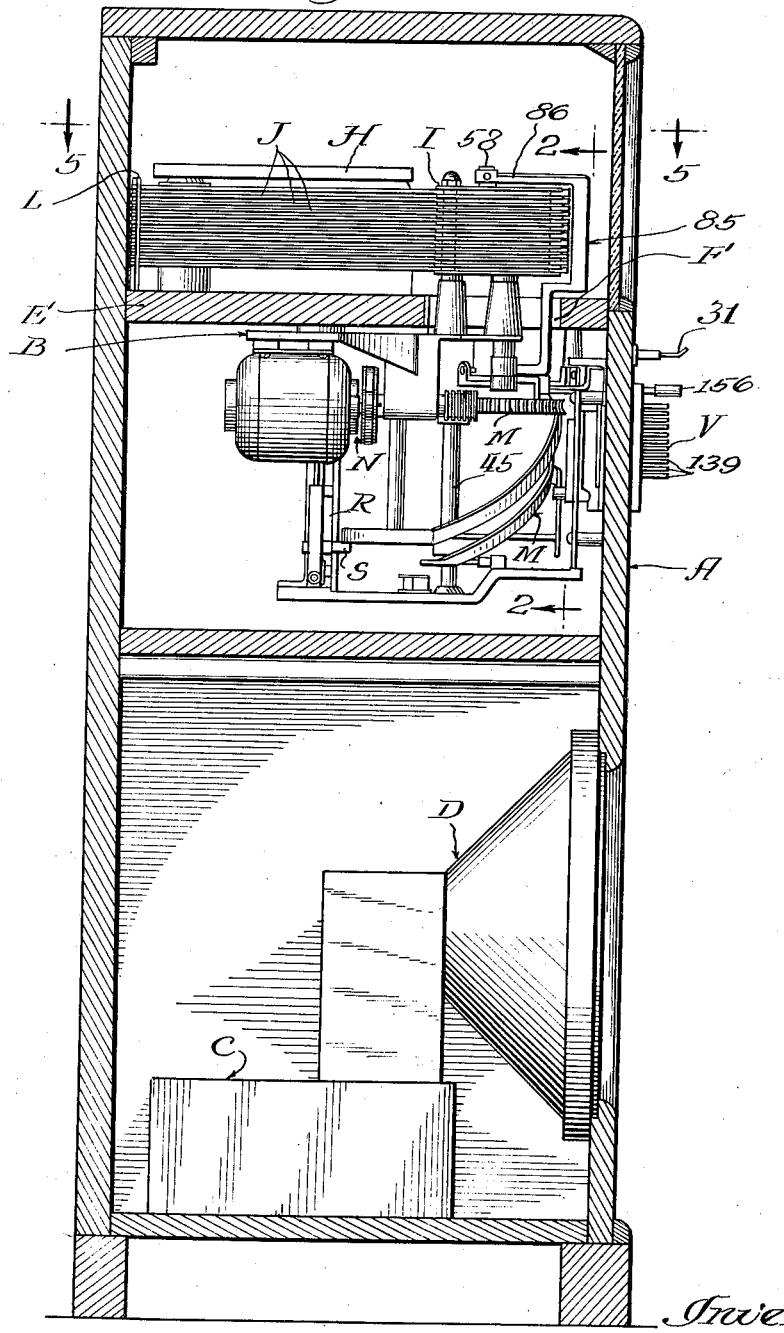
Fig. 1 is a vertical cross section of a phonograph embodying the features of the invention.

The illustrated phonograph is of the type disclosed in my United States Letters Patent No. 2,004,016 and my United States Letters patent application Serial No. 22,701, filed May 22, 1935, and is an improvement over that disclosed in United States Letters patent application of Benjamin F. Wupper and James A. Davis, Serial No. 47,656, filed October 25, 1935, now Patent No. 2,125,706. Since certain elements, assemblies, and arrangements of the phonograph have already been described in the above mentioned applications, they will not be described herein in detail, but will be briefly explained in a general manner.

General

As shown in Fig. 1, the phonograph comprises a casing or cabinet A of suitable construction for accommodating a chassis or frame B, amplifier means C, and speaker means D.

It will be understood that the chassis B is adapted to serve as mounting means for the record carrying and reproducing devices which, generally considered, cooperate to translate the irregularities or impulses recorded in the sound track of a record into mechanical vibrations and to convert those mechanical vibrations into electrical impulses. Those electrical impulses may then be supplied to the amplifier means C and, after amplification, they may be converted into sound by the speaker means D.

As shown in Figs. 1, 2, and 5, the chassis B includes a mounting panel E, commonly referred to as a motor board, having an aperture F therein, and carries above the mounting panel a turntable G; record playing or reproducer means H; a record carrier supporting or mounting assembly I; a plurality of pivoted, ring shaped record carriers or trays J arranged one above another in column or stack relationship and swingable to and from cooperative relationship with the turntable G; and members K and L providing individual supports for each record carrier J at the end thereof opposite the mounting assembly I when the record carrier in in its position of cooperation with the turntable and when it is in stack.

Below the mounting panel E, the chassis B, as will be seen by reference to Figs. 1, 2, 4, and 6, carries a master cam M; driving means N for driving the cam M; turntable rotating means O engaging a shaft P that carries at its upper end the turntable G and that is movable as indicated at Q (Fig. 2) toward and away from the reproducer means H; a reciprocable slide R having a cam follower S and a turntable reciprocating arm T; cam operable reproducer return means U for returning the reproducer means H to its starting position upon the completion of the playing of a record; and various control devices which have been generally designated by the reference characters W, X, Y, and Z.

Phonographs of the class to which this invention relates, are usually, but not necessarily, controlled by coin operated means controlled, as shown in Fig. 7, by a slidable coin freed receiver 31 for delivering a coin to a coin slide or chute 32. That coin operated means comprises a switch arm 33 swingable about its pivot 34, when engaged by a coin in the slide 32, whereby to close switch contacts 35. The contacts 35 control an electrical circuit including a suitable source 36 of electrical energy, and the control device W, which may be an electromagnet adapted to operate a pawl 37 for operating a ratchet 38 of the control device K. A pin or stud 39 on the ratchet 38 normally engages a switch operating arm 41 for holding switch contacts 42 open. When the ratchet 38 is operated by the pawl 37, the pin 39 releases the switch operating arm 41 permitting the contacts 42 to close. The turntable rotating means O is thereby connected in circuit with a suitable source of electrical energy, diagrammatically illustrated at 43, which energizes the turntable rotating means O to cause it to rotate the turntable G.

When the contacts 42 are thus closed by the operation of the control means W, they also connect the cam driving means N in circuit with the source 43 of energy through normally closed switch contacts 44 of the control device Z. The master cam M is thereby rotated, which causes the rotation of its shaft 45 on which the cam M is fixed and also the rotation of a notched disc 46 of the control device Z. The rotating master cam M by engaging the cam follower S raises the reciprocable slide R which carries with it the turntable reciprocating arm T, whereby to raise the rotating turntable G. If one of the record carriers J is in the position of cooperation with the turntable, the turntable during its last described movement passes through the carrier J and removes therefrom the record. The turntable continues its movement to bring the record into playing engagement with the record reproducer means H.

When the master cam M has rotated sufficiently to bring the turntable G into playing position, the cam shaft 45 has rotated the notched disc 46 until the notch therein registers with a switch operating arm 47 which permits the normally closed switch contacts 44 of the control device Z to open whereby to open the circuit including the cam driving means N. The cam M thereupon ceases to rotate and the reproducing means H plays the record on the turntable G.

In playing the record, the reproducer means H swings inwardly toward the center of the record being played on the turntable, thus rotating a shaft 48 (Figs. 4 and 7) connected with the reproducer means H and drivingly engageable with a notched disc 49 carried on the shaft 48. That notched disc 49 constitutes a part of the control device Y and has an operating projection 51 thereon which, during the rotation of the shaft 48 by the playing movement of the reproducer means H, swings toward the reproducer return means U.

When the playing of the record is completed by the reproducer means H, the shaft 48 has rotated the notched disc 49 of the control device Y until the projection 51 is adjacent the reproducer return means U and the notch in the disc 49 registers with a switch operating arm 52 controlling normally open switch contacts 53. Upon registration of the switch operating arm 52 with the notch in the disc 49 of the control device Y, the normally open switch contacts 53 close, thereby again connecting the cam driving means N in circuit with its energy supply source 43 and again causing it to rotate the master cam M and its shaft 45.

When the rotation of the master cam M is thus resumed, the cam follower S engaging in the cam track, and the slide R carrying the follower S are moved by the cam in a direction to cause the turntable reciprocating arm T to move the turntable G away from the reproducer means H and back through the positioned record carrier J whereby to deposit the played record thereon. Meanwhile, and after the played record has thus been moved out of playing engagement with the reproducer means H a pin or stud 54 on the rotating master cam M engages the reproducer return means U and moves it to swing the disc 49 by engagement with its projection 51 in a direction to return the reproducer means to its starting position.

During that rotation of the disc 49 the notch in the disc passes beyond the switch operating arm 52 and the periphery of the disc cams the arm 52 in a direction to open the switch contacts 53. The opening of the switch contacts 53 does not, however, result in the stopping of the cam driving means N for the reason that before they have been opened, the rotation of the master cam M and its shaft 45 has caused the rotation of the notched disc 46 of the control device Z sufficiently to move the notch in that disc out of registration with the switch operating arm 47. During that rotation of the disc 46 the periphery of the disc has, before the opening of switch contacts 53, cammed the switch operating arm 47 in a direction to close the switch contacts 44 whereby the circuit including the energy source 43, the cam driving means N, the switch contacts 44, and the switch contacts 42 is reestablished.

The cam driving means N therefore continues driving the master cam M, its shaft 45, and the notched disc 46. When the rotating master cam M has completed its movement of the follower S the slide R, and the turntable reciprocating arm T in moving the turntable G away from the playing position, a pin or stud 55 (Fig. 6) on the notched disc 46 of the control device Z engages a reciprocable pawl 56 adjacent the ratchet 38 and moves the pawl 56 against the action of a spring 57. As soon as the notched disc 46 is rotated sufficiently for the pin 55 to disengage the reciprocable pawl 56, the spring 57 moves the pawl 56 in a direction to operate the ratchet 38 whereby the pin 39 on the ratchet engages the switch operating arm 41 and operates it to open the switch contacts 42. That opening of the switch contacts 42 interrupts not only the circuit including the cam driving means N but also that including the turntable rotating means O, whereupon the foregoing cycle may be repeated, if desired, by subsequent operations of the coin operated means.

In accordance with the present invention, the record carriers J are pivoted on a post 58 between successive discs 59 in the mounting assembly I. Each record carrier has an arm or projection 61 extending beyond the peripheries of the discs 59 at the side of the assembly I opposite the record carriers proper. The arms 61 cooperate with releasable record carrier locking means for releasably locking each record carrier in stack position.

*Releasably locking record carriers in stack*

For releasably locking the record carriers in stack, I form the outer end of each arm 61 with a pair of opposed, spaced shoulders 62 and 63, and each disc 59 with a shoulder 64. A latch member 65 is pivoted as at 66 on each arm 61 outwardly of the discs 59 and comprises a plate-like member formed with a finger 67 extending inwardly of the assembly I at the level of the disc 59 upwardly adjacent the arm 61, and a finger 68 extending outwardly of the assembly I at one side of the pivot 66. At the other side of the pivot 66, each plate-like latch member 65 is formed with a depending flange 69 having a finger 71 adapted to extend into the space between successive discs 59. A coil spring 72 seating at one end in a socket 73 in the shoulder 62 and at its other end against the depending flange 69, which may be provided with a spring retaining stud 74, is adapted yieldably to hold the latch member 65 in a position at which the finger 67 interlockingly engages the disc shoulder 64 of the next upper disc 59 for releasably locking the corresponding record carrier in stack.

*Record carrier releasing means*

Each finger 67 is provided with a depending portion 75 which extends beyond the end of the finger into the space between successive discs 59 and at its other end is formed at an angle to provide a laterally extending finger 76. The fingers 76 are selectively operable by a selector 77 carried at an end of a rockable and longitudinally reciprocable shaft 78 slidably journaled as at 79 in a selector control frame V suitably secured to the front of the chassis B as shown in Figs. 1 and 8. The selector 77 is of plate-like construction having a cam surface 81 and secured as at 82 on the outer end of an arm 83 rockable with the shaft 78.

Upon operation of the selector 77, the cam surface 81 is adapted to engage the finger 76 of one of the latch members 65 and to cam the latch member about the pivot 66 in a direction of movement yieldably opposed by the spring 72 to disengage the finger 67 and the shoulder 64. When any latch member 65 is thus released, the angularity of its finger 76 and the shape of the cam surface 81 cause the record carrier arm 61 carrying the released latch member 65 to swing about the pivot post 58 a distance sufficient to cause the end of the finger 67 to engage against the arcuate edge portion 84 of the disc 59 whereby the corresponding record carrier is free and may be swung about the pivot post 58 to and from its position of alignment with the turntable. Engagement between the edge portion 84 and the finger 67 holds the released latch member 65 in released position during the swinging of the record carrier.

*Record carrier swinging means*

The record carrier swinging means comprises a swingable yoke-like member 85 having an arm 86 fixed on an end of the pivot post 58 at one end of the assembly I and extending radially outwardly therefrom beyond the peripheries of the discs 59; a channel shaped, record carrier swinging member 86' with spaced parallel channel legs 87 and 88 extending alongside and outwardly of the assembly I, which the channel member 86 faces; an offset portion 89 beyond the end of the assembly I opposite the arm 86 and extending from the channel member 86 inwardly of the assembly I and parallel to and spaced from the panel E; and an angular connecting member having a leg 92 connected to the inner end of the offset portion 89 and extending therefrom through the aperture F, and a leg 93 connected at one end to the leg 92 and extending therefrom to the pivot post 58 to which it is secured as shown at 94 in Fig. 20.

Normally while the record carriers J are in stack position, the yoke-like member 85 is in such a position that the channel leg 87 is spaced slightly outwardly from the outer ends of the fingers 68 as shown in Fig. 19. Thus when any one of the latch members 65 is released as already described, the end of the finger 68, swinging with the latch member about the pivot 66 and subsequently about the pivot post 58, clears the longitudinal edge of the channel leg 87 and moves to a position between the channel legs 87 and 88. In that position the leg 87 will engage the finger 68 when the yoke-like member 85 is swung in a clockwise direction, as viewed in Fig. 19, for swinging the record carrier to a delivery position.

Loosely secured on the post 58 adjacent the angle leg 93 is a bell crank lever having a leg 95 provided with a cam roller or follower 96 depending therefrom into a cam groove 97 on the master cam M, and with a pair of spaced upstanding lugs 98. Each lug 98 carries an adjustable spring mounting screw 99 for cooperating with one of a pair of sockets 101 in opposite sides of a crank arm 102 to carry a coil spring 103, the crank arm 102 being connected to the angle leg 93. As the cam M is rotated the cam groove 97 operates the leg 95 and thereby the crank arm 102 to oscillate the yoke-like member 85 whereby the channel leg 87 will cooperate with the finger 68 of any released latch member 65 to swing the corresponding record carrier toward the path of the turntable and the channel leg 88 will cooperate with the shoulder 63 of the record carrier arm to swing that record carrier away from the path of the turntable and toward the stack of record carriers. The bell crank lever just mentioned has another leg 104 provided with a cam surface 105 engageable by a cam stud or follower 106 on the master cam M for moving the bell crank lever to move the cam follower 96 by a substantially "dead center" position 107 in the cam groove 97.

When a record carrier has been swung to its position of alignment with the turntable, it is held in that position by the engagement between the finger 68 and the channel leg 87 of the yoke member 85. The holding of the record carrier in that position is effected by the engagement of the cam follower 96 in the cam groove 97 whereby the springs 103 serve as resilient stops for the crank arm 102. The spring mounting screws 99 may be adjusted to adjust the record carrier in delivery position to alignment with the turntable.

Selector rocking means

For rocking the selector 77 whereby to release one of the latch members 65, the selector shaft 78 is provided with a keyway 108 extending longitudinally thereof for cooperation with any suitable keying means 109 of a cam lever 111 on the shaft 78. The cam lever 111 is secured against reciprocable movement therewith at a level slightly above the master cam M by a bracket 112 secured as at 113 to the selector control frame V. The keyway 108 and the keying means 109 permit the shaft 78 to reciprocate longitudinally thereof relative to the cam lever 111, and provide a driving connection between the cam lever and the shaft, whereby the shaft may be rocked about its longitudinal axis when the cam lever is operated.

The cam lever 111 has a cam surface 114 engageable by the cam follower 106 and a stud or pin 115 on the cam M, after the follower 106 has caused the follower 96 to move beyond the position 107 in the cam groove 97, for rotating the shaft 78 in a direction to cause the selector 77 to release one of the latch members 65 as already described, and a contiguous cam surface 116 for permitting the cam lever 111 and the shaft 78 to rotate in the opposite direction after the pin 115, in rotating with the cam M, has moved beyond the cam surface 114.

Selector reciprocating means

A reciprocable plate-like slide member 117 is provided with a plurality of bifurcated lugs 118 at its opposite sides for slidably engaging the opposite faces of a pair of spaced guide rails 119 suitably secured to rearwardly projecting studs 121 of the selector control frame V. The rear face of the slide plate 117 is formed with an outstanding transverse rib 122 at one side of a rectangular aperture 123 in the plate 117 and a pair of spaced lugs 124 at the other side of the aperture 123 to facilitate rotatably securing the selector shaft 78 to the slide plate 117.

In securing the selector shaft 78 to the slide plate 117, the lower end of the shaft is positioned between the lugs 124 in such a manner that an arm 125 fixed on the shaft is positioned between the rib 122 and the lugs 124 and extends into the aperture 123 in the slide plate, whereby the shaft and slide plate will reciprocate together. The arm 125 is rockable with the shaft 78 and, during the rotation of the shaft for operating the selector 77 to release a latch member 65, the outer or free end of the arm swings through the aperture 123 to a position forwardly of the slide plate 117 for a purpose which will be described presently. If desired a strap 126 may be bridged between the rear ends of the spaced lugs 124 for retaining the lower end of the selector shaft between the lugs.

For reciprocating the slide plate 117 whereby to reciprocate the selector shaft 78, the slide plate is provided with a cam roller or follower 127 projecting rearwardly from its rear face. The roller 127 is adapted to cooperate with a cam shaped rail 128 which is preferably integral with the barrel cam M (otherwise like that disclosed in my said application, Serial No. 22,701), and is carried peripherally outwardly thereof by a radial arm 129 and a turntable raising rail 131 of the cam M.

The cam rail 128 is provided with a rise portion 132, a dwell portion 133 following the rise portion, and a relatively abrupt drop portion 134 following the dwell portion. After the turntable has been lowered and while the record carrier is being returned to stack by the cam M, the rise portion 132 is adapted to raise the slide plate 117 and the selector shaft 78 sufficiently to move the selector 77 above the level of the uppermost latch member, releasing finger 76, where the selector is normally held during inoperative periods of the phonograph by engagement between the cam follower 127 and the dwell portion 133. Upon starting the phonograph, the drop portion 134 of the cam rail 128 permits rapid and silent lowering of the cam follower 127 and hence the slide plate 117, the selector shaft 78, and the selector 77 before the selector 77 is rotated in a latch member releasing direction by the rollers or pins 106 and 115 and the cam lever 111.

Selector control

The selector control comprises operable means for stopping the selector 77 at the elevation of a desired latch member releasing finger 76, automatically operating means for restoring the operable means during the operation of the latch member releasing finger 76 by the selector 77 at that elevation, automatically operating means for supporting the selector at that elevation after the operable means is restored, and the selector frame V including the selector shaft journal 79 and the lugs 121 and, as already explained, suitably secured to the main frame B.

As operable means for stopping the selector 77 at the elevation of a desired latch member, releasing finger 76, a horizontally pivoted plate 135 is swingably carried at the upper end of the slide plate 117 by upstanding arms 136 at opposite ends of the plate 135, pivoted to upstanding lugs 137 at opposite sides of the slide plate 117. A depending finger 138 at the rear side of the plate 135 is engageable with the upper portion of the slide plate 117 for limiting the rotation of the plate 135 in one direction.

A plurality of reciprocable rods 139, one for each record carrier J, are reciprocable one or more at a time to and from a position in the path of the pivoted plate 135 as that plate moves with the slide plate 117. Each rod 139 intermediate its ends is provided with three spaced flanges 141, 142, and 143 and the rear end of each rod is inserted through an aperture 144 in a rectangular plate 145 until the flange 141 has passed through that aperture, whereupon each rod is moved bodily transversely of the plate 145 into a smaller aperture 146 in the plate adjacent the aperture 144, and providing a bayonet type of aperture therewith. The rods are slidable in that position between positions of engagement between the rear face of the plate 145 and the flange 141 and between the front face of the plate 145 and the flange 142.

For each rod 139, there is an aperture 147 in a front selector frame member 148 and that aperture 147 is enlarged as at 149 rearwardly of the front face of the frame member 148 to provide an internal shoulder 151. The rods 139 assembled to the plate 145 may be inserted in the respective enlarged portions 149 of the apertures 147 and moved forwardly until the flanges 143 abut the shoulders 151. In that position the forward ends of the rods 139 extend forwardly of the selector frame member 148 to provide push buttons for operating the rods. The plate is movably carried rearwardly of the frame member 148 by pins 152 projecting forwardly from the plate at its corners and slidably receivable in sockets 153 in the frame member 148. A coil spring 154 is placed on each pin 152 between the plate 145 and the frame member 148 for yieldably holding the plate spaced rearwardly of the frame member 148 and between the flanges 141 and 142 of the respective rods 139. A spring urged pin 155 extends into each enlarged portion 149 of each aperture 147 between the flanges 142 and 143 for limiting the reciprocable movement of the rods 139.

The rods 139 may be individually moved into the path of the pivoted plate 135 by pushing them inwardly of the frame member 148. For restoring the rods to their outer positions, I provide a cancellation rod 156 which has a flange portion 157 reciprocable in a passage 158 in the frame member 148 and which has a shank portion 159 extending forwardly through an aperture 161 outside and forwardly of the frame member 148 where the shank portion is equipped with an operating push button handle. The shank portion 159 is engageable with one end of a lever 162 which is pivoted intermediate its ends as at 163 in a rectangular aperture 164 in and longitudinally of the frame member 148 and which has another end secured as at 166 to and centrally of the plate 145. When the cancellation rod 156 is pushed inwardly it pivots the lever 162 causing the lever through the connection 166 to move the plate 145 forwardly against the action of the springs 154 whereby the plate 145 will engage the flange 142 of any operated rod or rods 139 and return it or them to the outer position. Upon release of the cancellation rod, the springs 154 return the plate 145 to its initial position causing the plate through the connection 166 to restore the lever 162 and the cancellation rod 156 to their initial positions.

A plurality of the rods 139 may be moved simultaneously into the path of the pivoted plate 135 by pushing outwardly on a pin 167 slidably carried in an aperture 168 in the frame member 148 and extending rearwardly therefrom through an aperture 169 in the plate 145 into the path of the pivoted plate 135. The aperture 168 communicates with a transverse slot 171 in the frame member 148, which in turn communicates with the aperture 164. The pin 167 is provided with a projection 172 which in the slot 171 extends into and transversely of the aperture 164 and which is reciprocable with the pin 167. The projection 172 is engageable with one end of a lever 173 pivoted as at 174 in the lower end of the aperture 164 and having an end 175 engageable with the lower end of the lever 162.

When the pin 167 is pushed outwardly, the projection 172 engages the lower end of the lever 173 and pivots the lever causing the upper end 175 to engage the lower end of the pivoted lever 162. Thus the lower end of the lever 162 is moved inwardly about its pivot 163 against the action of a spring 176. The inward movement of the lower end of the lever 162 through the connection 166 moves the plate 145 inwardly, causing the plate to engage the flanges 141 of the push rods 139 and to move the push rods into the path of the pivoted plate 135. When the pin 167 is released, it is returned to its initial position by the action of the spring 176 on the lever 162 and through that lever to the upper end 175 of the lever 173.

As the slide plate 117 moves upwardly, the pivoted plate 135 will engage the inner end or ends of any of the rods 139 which may have been pushed inwardly as described above, and will be swung downwardly from a horizontal position by such engagement. To assure its return to the horizontal position at which the finger 138 engaging with the upper end of the slide plate 117 serves as a limiting stop, I prefer to mount the cam follower 127 on a depending arm 177 of a bell crank lever. That bell crank lever is pivoted as at 178 on the inner face of the slide plate 117 and has another arm 179 pivotally connected to a bar 181 which is reciprocably secured to the rear face of the slide plate 117 by a pin 182 passing through an elongated aperture 183 in the bar 181 and into the slide plate. The upper end of the bar 181 is turned outwardly into the space between the slide plate 117 and the pivoted plate 135 to provide a horizontal arm 184. As the slide plate is moved upwardly the rise portion 132 of the cam rail 128 so engages the cam follower 127 as to hold the bell crank lever in a position at which the arm 184 permits the downward swinging of the pivoted plate 135 when it engages one of the operated rods 139. As the follower 127 starts down, the drop portion 134 cams it about the pivot 178 causing the arm 179 of the bell crank lever to raise the bar 181 until the horizontal arm 184 levels the pivoted plate 135.

Thus, when the slide plate 117, and hence the selector, are moving downwardly, the pivoted plate 135 is in a horizontal position and the plate 135 will engage and will be arrested by which ever rod 139 that is operated, or by the uppermost operated rod 139, if more than one of them has been operated. Such stopping of the plate 135 stops the downward movement of the slide plate 117, thus stopping the selector 77 at the elevation of the latch member, releasing finger 76 controlling the record carrier corresponding to the effective push rod 139. If none of the rods 139 has been operated, the plate 135 in its downward movement will be stopped just above the pin 167 at the lower end of the travel of the slide plate 117.

For automatically restoring each rod 139 to its outer or non-selecting position after it has been effective to stop the selector at the desired elevation, I pivot as at 185 a plate 186 at its lower end to forwardly extending lugs 187 at opposite sides of the forward face of the slide plate 117. That plate 186 extends upwardly along the slide plate to the upper end thereof, where the plate is provided with a forwardly extending ledge or other projection 188 spaced below the pivoted plate 135 such a distance that when the plate 135 engages upon a rod 139, the projection 188 is at the same level as the end of the rod and is engageable therewith when the plate 186 is swung forwardly about its pivot 185. At the lower end of its travel with the slide plate 117, the projection 188 is engageable with the pin 167. The plate 186 is provided with a rectangular aperture 189 which registers with the rectangular aperture 123 in the slide plate 117 and which is covered by a strip 191 resiliently secured on the forward face of the plate 186 by the pin-and-spring constructions illustrated at 192 in Fig. 15. Just below the strip 191 the plate 186 is resiliently secured to the slide plate 117 by a shouldered pin 193 passing through apertures 194 and 195 in the respective plates 117 and 186 and a coil spring 196 on the pin forwardly of the plate 186 between a fixed abutment 197 at the forward end of the pin and a slidable abutment 198 adjacent the plate 186.

Rotation of the selector shaft 78 in a direction to move the selector 77 for operating a latch member, releasing finger 76 causes the arm 125 at the lower end of the selector shaft to swing through the registering apertures 123 and 189 in the slide plate 117 and the plate 186 into engagement with the resiliently held strip 191 and to swing the plate 186 forwardly about its pivot 185 against the action of the spring 196. The forward swinging of the plate 186 causes the projection 188 at the upper end thereof to engage the inner end of any rod 139 on which the pivoted plate 135 is resting and to move that rod 139 forwardly out of the path of the pivoted plate 135, or as the case may be, to engage the inner end of the pin 167 and to move that pin in a direction to move a plurality of the rods 139 into the path of the pivoted plate 135. The spring 196 is adapted automatically to return the plate 186, the arm 125, and the selector shaft 78 to their initial positions.

For supporting the selector at any of its elevations after the rod 139 is thus restored and until the selector is subsequently actuated by the cam rail 126, I form a rack 199 along an edge of one of the guide rails 119, a cam surface 201 at the upper end of the rack 199, and a cam surface 202 at the lower end of the rack 199 terminating at a shoulder 203 at the edge of the guide rail. Cooperating with the rack is a reciprocable pawl 204 slidably mounted on the rear face of the slide plate 117 by the pins 192 and 193 passing through elongated apertures 205 and 206, respectively, in the pawl. A spring 207 resiliently urges the pawl toward engagement with the rack 199. The pawl is provided with a slot 208 at its lower side for releasable engagement with a finger 209 of a spring urged lever 211. That lever 211 is pivoted as at 212 on the forward face of the pivoted plate 186 in such a position that the finger 209 extends rearwardly through an aperture 213 in the plate 186 and an aligned aperture 214 in the slide plate 117.

During the elevation of the slide plate 117, the selector shaft, and the selector, the pawl slides over the teeth of the rack 199. At the upper position of the slide plate 117, the pawl 204 engages the cam surface 201 and is cammed longitudinally to a position at which the slot 208 registers with the finger 209 of the spring urged lever 211. The finger 209 thereupon springs rearwardly into the latching engagement in the slot 208 for holding the pawl in that position, where it will be seen by reference to Fig. 9 that the pawl is beyond the extremities of the teeth of the rack 199.

During the lowering of the slide plate 117 the pawl 204 does not therefore engage the rack 199.

When the pivoted plate 186 is, however, swung rearwardly, as already described, for restoring the rod 139 which is engaging the plate 135, the lever 211 moves rearwardly, disengaging the pawl 204, whereupon the spring 207 draws the pawl 204 into supporting engagement with the rack 199 whereby to hold the slide plate 117, the selector shaft, and the selector in their respective positions after the rod 139, which has been effective to arrest them in those positions, is restored.

Operation

In the normal non-playing position of the novel phonograph, the record carriers J are in stack; the turntable G is down; the reproducer H is in the starting position shown in Fig. 5; the slide plate 117 is raised to such an elevation that the selector 77 is at a level above that of the uppermost finger 76 and the pawl 204 has been cammed out beyond the teeth of the rack 199 where it is latched by the finger 209 engaging in the slot 208; and the cam followers 106 and 115 are in the positions shown in Fig. 4.

As already explained, the phonograph may be started by the operation of the token or coin operated apparatus 31, 32 upon the insertion therein of one or more tokens or coins depending upon whether one or more records are to be played. The rods 139 may be operated before or after the operation of the apparatus 31, 32. Thus one or more rods 139 are moved inwardly into the path of the pivoted plate 135, that is to say, to the selecting position. When the control apparatus 31, 32 is operated, the driving means N is energized to cause the rotation of the master cam M carrying the cam followers 106 and 115, and the driving means O is energized to rotate the turntable G.

The drop portion 134 of the cam rail 126 cooperating with the cam followers 127 lowers the slide plate 117 and with it the selector shaft 78 and the selector 77 until the pivoted plate 135 engages on the uppermost rod 139 which has been moved to the selecting position. If no rod 139 is in selecting position, or if the rod 139 corresponding to the lowermost record carrier J is in selecting position, the slide plate 117 is lowered to its lowermost position. In that manner, the slide plate 117 is brought to rest with the selector 77 at the level of the latch member, releasing finger 76 corresponding to the rod 139 engaged by the pivoted plate 135 and to the record carrier J releasably latched in stack by the latch member controlled by that finger 76. When the slide plate 117 descends to its lowermost position, the selector 77 is lowered to the level of the lowermost latch member, releasing finger 76.

The cam followers 106 and 115 on the master cam M, after the positioning of the selector 77 as just described, engage the cam lever 111 and thereby rock the selector shaft 78 sufficiently to cause the selector 77 to operate the latch member, releasing finger 76 at the same level. In that manner the selected record carrier J is disengaged from the disc 59 and is engaged with the channel leg 87 of the swingable member 85. The rocking movement of the selector shaft 78 causes the arm 125 to swing the plate 186 forwardly so that the projection 188 restores the rod 139 which has arrested the slide plate 117, the selector shaft 78, and the selector 77.

If none of the upper rods 139 has been moved to a selecting position so that the slide plate 117 descends to its lowermost position, the rocking movement of the selector shaft 78 causes the selector to operate the latch member, releasing finger 76 corresponding to the lowermost record carrier J to disengage that record carrier from the disc 59 and to engage it with the channel leg 87 of the swingable member 85. In addition, such rocking movement of the selector shaft 78 in its lowermost position causes the arm 125 to swing the plate 186 forwardly so that the projection 188 restores the lowermost rod 139, if it is in the selecting position, and operates the pin 167 for moving a plurality of the rods 139 to their selecting positions.

Upon the restoration of one of the rods 139 to its non-selecting position out of the path of the pivoted plate 135, as described above, the slide plate 117 does not lower the selector 77, for the reason that upon the forward swinging of the plate 186 to restore a rod 139 and/or to operate the pin 167, the finger 209 is withdrawn from the slot 208 in the pawl 204, which is thereupon moved into supporting engagement with the rack 199 by the spring 207. In that manner the slide plate 117, the selector shaft 78, and the selector 77 are latched at the elevations at which they were last effective until the rise portion 132 of the cam rail 128 next actuates the follower 127 to elevate the selector 77 to its level above the uppermost finger 76.

After the release of the selected record carrier J and after it is engaged with the swingable member 85, that member is swung in a delivery direction by the cam groove 97 in the rotating master cam M and the cam follower 96, whereby to swing the released record carrier to its delivery position in alignment with the rotating turntable G. The master cam M now actuates the cam follower S to raise the reciprocable slide R which carries with it the turntable raising arm T, whereby to raise the rotating turntable G through the selected record carrier J. The turntable is thus raised to remove the selected record from the record carrier in alignment with the turntable and to present that record for playing by the reproducer means H. In that playing position the switch contacts 44 of the control device Z open, as already described, whereby to deenergize the cam driving means N and to cause the cam M to cease rotating.

When the reproducer means H in playing the record reaches the end of the record groove, the switch contacts 53 of the control device Y are closed, as already explained, whereby again to connect the cam driving means N in circuit with its energy supply source 43 and again to cause the driving means N to rotate the master cam M. When the cam M thus resumes its rotation, it actuates the cam follower S and the slide R to lower the turntable G. After the turntable has thus been moved away from the reproducer means H, the reproducer return means U returns the reproducer means H to its starting position, and the turntable deposits the played record on the record carrier from which it was originally removed and which has been held in the delivery position during the playing of the record by the engagement of the cam follower 96 in the cam groove 97 of the master cam M.

After the played record is deposited on the record carrier, the cam groove 97 actuates the cam follower 96 to swing the swingable member 85 away from its delivery position. In thus swinging, the channel leg 88 of the swingable member 85 engages the shoulder 63 at the outer end of the arm 61 of the record carrier bearing the played record, and swings the arm in a direction to return the record carrier to the stack. In that position, the spring 72 operates the latch member 65 about its pivot 66 for releasably latching the record carrier to the disc 59.

During that return movement of the record carrier bearing the played record, the rise portion 132 of the cam rail 128 rotating with the master cam M engages the cam follower 127 on the slide plate 117 and raises the slide plate to a position at which the cam surface 201 of the rack 199 cams the pawl 204 longitudinally to its position beyond the extremities of the rack teeth. At that position of the pawl 204, the slot 208 in the pawl registers with the finger 209 of the spring urged lever 211 and the finger enters the slot to latch the pawl at the position at which it will not engage the teeth of the rack 199 until the plate 186 is again operated for restoring a rod 139 or for operating the pin 167 as already described. The slide plate 117 is held in that raised position by the engagement of the cam follower 127 on the dwell portion 133 of the cam rail 128. In that position of the slide plate 117, the selector 77 is at its level above the uppermost, latch member releasing finger 76.

When the selector 77 has been elevated, as just described, after the return of the played record to stack, the pin 55 of the control device Z operates the pawl 56 against the action of the spring 57 and then disengages the pawl 56 whereupon the spring 57 operates the pawl to rotate the ratchet 38 of the control device X. The rotation of the ratchet 38 causes the pin 39 thereon to open the switch contacts 42 when the number of records corresponding to the number of tokens or coins inserted in the apparatus 31, 32 has been played. If fewer than that number of records have been played, the foregoing cycle will be repeated until the switch contacts 42 are opened. Opening of the switch contacts 42 interrupts not only the circuit including the cam driving means N, but also that including the turntable rotating means O whereby to stop the phonograph.

While I have described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A multi-record phonograph comprising a plurality of independently swingable record carriers normally arranged in superposed relationship, record reproducer means, a turntable cooperable with said record carriers for moving records to and from playing relation with said reproducer means, means releasably latching said record carriers in superposed relationship, record carrier swinging means for swinging said record carriers to and from cooperative relationship with said turntable, a reciprocable and rockable selector for operating the latching means, and means for operating said selector to release any said record carrier and to latch it to said record carrier swinging means.

2. A multi-record phonograph comprising record reproducer means, a turntable, a plurality of superposed, independently swingable record carriers cooperable with said turntable for moving records to and from playing relation with said reproducer means, adjustable means for swinging said record carriers one at a time to and from cooperating relation with said turntable, said adjustable means including releasable latching means for latching said record carriers in superposed relationship, means for operating said releasable latching means to release a plurality of said record carriers one at a time in a desired sequence, and means for adjusting the said adjustable means to adjust the position to which a said record carrier is swung for cooperating with the turntable.

3. A multi-record phonograph comprising a record player, a turntable, a plurality of superposed, pivoted record carriers cooperable with said turntable for moving records to and from playing relation with said record player, a swingable member, a plurality of latch members, one for each record carrier, releasably latching said record carriers in superposed relation and individually operable to release the respective record carriers and to latch the same to said swingable member, a selector reciprocable alongside of said latch members and rockable at the position of any one of said latch members for operating the same, cam means for moving said selector in one direction between the extreme latch members, cam means for permitting the movement of said selector in the opposite direction between the extreme latch members, selector control means for stopping said selector at the position of any one of said latch members, and means for rocking said selector to operate that latch member.

4. A multi-record phonograph comprising a record player, a turntable, a plurality of superposed, pivoted record carriers cooperable with said turntable for moving records to and from playing relation with said record player, a swingable member, a plurality of latch members, one for each record carrier, releasably latching said record carriers in superposed relation and individually operable to release the respective record carriers and to latch the same to said swingable member, a selector reciprocable alongside of said latch members and rockable at the position of any one of said latch members for operating the same, cam means for moving said selector in one direction between the extreme latch members, cam means for permitting the movement of said selector in the opposite direction between the extreme latch members, selector control means for stopping said selector at the position of any one of said latch members, means for rocking said selector to operate that latch member, and means for releasably latching said selector in any position at which it is stopped by said selector control means until the first said cam means begins moving said selector to an extreme latch member.

5. In a multi-record phonograph, record playing means, a plurality of superposed, pivoted record carriers, and means for selectively rendering said record carriers active for cooperation with said playing means, comprising a reciprocable, rockable selector pivoted to rock about its axis spaced from the pivotal axis of the record carriers, cam means for reciprocating said selector, means for stopping said selector at a position corresponding to a predetermined record carrier, and means for rocking said selector about its said axis when stopped by the last said means.

6. In a multi-record phonograph, record playing means, a plurality of superposed, pivoted record carriers, and means for selectively rendering said record carriers active for cooperation with said playing means, comprising a reciprocable, rockable selector, cam means for reciprocating said selector, means for stopping said selector at a position corresponding to a predetermined record carrier, means for rocking said selector when stopped by the last said means, and means for releasably latching said selector in any positon at which it is stopped by the stopping means.

7. In a multi-record phonograph, record playing means, a plurality of superposed, pivoted record carriers, and means for selectively rendering said record carriers active for cooperation with said playing means, comprising a reciprocable, rockable selector, cam means for reciprocating said selector, means for stopping said selector at a position corresponding to a predetermined record carrier, operable rocking means for said selector, operable latching means for said selector, and means for operating said rocking means and said latching means to rock said selector when stopped by the stopping means and releasably to latch said selector in the stopped position.

8. In a multi-record phonograph, record playing means, a plurality of superposed pivoted record carriers, a reciprocable rockable selector for rendering said record carriers active for cooperation with said playing means, cam means for reciprocating said selector, means for stopping said selector at a position corresponding to a predetermined record carrier, means for releasably latching said selector in a stop position, comprising a rack and pawl, resilient means urging said pawl in engagement with said rack, a cam surface at an end of the rack for releasing the pawl from engagement with the rack, a finger under spring tension for engaging said pawl and holding it out of engagement with said rack, a cam means for releasing said finger from engagement with said pawl, and cam means for simultaneously rocking said selector and operating the first said cam means.

9. In a multi-record phonograph, record playing means, a plurality of superposed pivoted record carriers, a reciprocable rockable selector for rendering said record carriers active for cooperation with said playing means, a plurality of selector rods for stopping said selector at a position corresponding to a predetermined record carrier, a floating plate having apertures through which the selector rods slidably pass, means on the selector rods at opposite sides of said floating plate for limiting the relative movement of the rods and the plate when such last said means engage with the plate, lever means to move said plate for engaging the means on the selector rods whereby to move any rod from a selecting position to a non-selecting position, and lever means automatically operable to move said plate for engaging with the means on the selector rods, whereby automatically and simultaneously to select a predetermined record carrier and to move a plurality of selector rods to selecting positions.

10. In a multi-record phonograph, record playing means, a plurality of superposed pivoted record carriers, a reciprocable rockable selector for rendering said record carriers active for cooperating with said playing means, and means for stopping the activating means at the selected record, comprising a plurality of selector rods movable to and from a selecting position, a sliding selector plate for moving said selector, a pivoted plate carried by said sliding plate, means for engaging said pivoted plate with one of said selector rods in selecting position when the sliding plate is moving in selecting direction, and cam means for operating said sliding plate and for operating the last mentioned means to operate the pivoted plate.

11. In a multi-record phonograph, record playing means, a plurality of superposed pivoted record carriers, a reciprocable rockable selector for rendering said record carriers active for cooperating with said playing means, and means for stopping the activating means at the selected record, comprising a plurality of selector rods movable to and from a selecting position, a sliding selector plate for moving said selector, a pivoted plate carried by said sliding plate, a movable arm for bringing said pivoted plate in a horizontal plane, a bell crank connected to said movable arm for engaging the arm with the pivoted plate when the crank is at one end of its arc of travel, and for disengaging said arm from the pivoted plate when said crank is at the other end of its arc of travel, cam means for swinging said bell crank to the engaging end of its arc of travel when the sliding plate is being moved in one direction, and for swinging the bell crank to the non-engaging end of its arc of travel when the sliding plate is being moved in the opposite direction.

12. In a multi-record phonograph, record playing means, a plurality of movable record carriers cooperable with said record playing means for changing records, a rockable, reciprocable selector for controlling the changing of records, means for controlling the operation of said selector comprising selector reciprocating means, a plurality of selector rods corresponding in number with the number of record carriers, means reciprocable with said selector and engageable with any said selector rod in its selecting position for predetermining the selecting position of said selector, means for rocking said selector in any selecting position for selecting a predetermined record carrier, and means movable by the rocking of said selector for returning the effective selector rod to its non-selecting position.

13. In a multi-record phonograph, record playing means, a plurality of movable record carriers cooperable with said record playing means for changing records, a rockable, reciprocable selector for controlling the changing of records, means for controlling the operation of said selector comprising selector reciprocating means, a plurality of selector rods corresponding in number with the number of record carriers, means reciprocable with said selector and engageable with any said selector rod in its selecting position for predetermining the selecting position of said selector, means for rocking said selector in any selecting position for selecting a predetermined record carrier, a pivoted plate movable with the selector for automatically returning the effective selector rod from a selecting to a non-selecting position, cam means operable by the rocking of said selector for moving said pivoted plate to engagement with said effective selector rod and returning it to a non-selecting position, and resilient means for returning said pivoted plate to its initial position and for effecting the return rocking of said selector.

14. In a multi-record phonograph, record playing means, a plurality of movable record carriers cooperable with said record playing means for changing records, a rockable, reciprocable selector for controlling the changing of records, means for controlling the operation of said selector comprising selector reciprocating means, a plurality of selector rods corresponding in number with the number of record carriers, means reciprocable with said selector and engageable with any said selector rod in its selecting position for predetermining the selecting position of said selector, means for rocking said selector in any selecting position for selecting a predetermined record carrier, a pivoted plate movable with the selector for automatically returning the effective selector rod from a selecting to a non-selecting position, cam means operable by the rocking of said selector for moving said pivoted plate to engagement with said effective selector rod and returning it to a non-selecting position, resilient means for cooperating with said cam means in moving said pivoted plate, and resilient means of comparatively greater resiliency than the last said resilient means for returning said pivoted plate to its initial position and for effecting a return rocking of said selector.

15. The combination in an automatic phonograph with record playing means, a plurality of movable record carriers normally latched in nonplaying position, and a selector, for selectively playing a plurality of records one at a time, of means for reciprocating said selector, a plurality of selector control rods movable to and from selecting positions, means reciprocable with said selector and cooperable with a selector control rod in its selecting position, for positioning said selector in a selecting position corresponding to the record carrier indicated by the cooperating selector control rod, operable means for rotating said selector in any selecting position in a direction to free the corresponding record carrier, means reciprocable with said selector and operable by the rotation thereof for moving the effective selector control rod to its non-selecting position, and means on the last said means for automatically returning it to its initial position and rotating said selector in the opposite direction.

16. In an automatic phonograph having a plurality of coaxially mounted swingable record carriers arranged normally in stack relation, stationary means, a record swinging member of channel form, latching means pivotally carried by each carrier and disposed radially inwardly of said swinging member and each having means for releasably securing the respective carriers to said stationary means when such carriers are in stack relation, and a selector for swinging any of such latch means pivotally from latching engagement with said stationary means for effecting latching engagement of the same within the channel of said swingable means for effecting movement of said carriers by said swingable member from and to said stack relation.

17. A multi-record phonograph comprising a plurality of independently movable record carriers normally arranged in superposed relationship, record reproducer means, a turntable cooperable with said record carriers for moving records to and from playing relation with said reproducer means, means releasably latching said record carriers in superposed relationship, record carrier moving means for moving said record carriers to and from cooperative relationship with said turntable, a reciprocable and rockable selector for operating the latching means, and means for operating said selector to release any said record carrier and to latch it to said record carrier moving means.

18. A multi-record phonograph comprising a record reproducer means, a turntable, a plurality of superposed independently movable record carriers cooperable with said turntable for moving records to and from playing relation with said reproducer means, adjustable means for moving said record carriers one at a time to and from cooperating relation with said turntable, said adjustable means including releasable latching means for latching said record carriers in superposed relationship, means for operating said releasable latching means to release a plurality of said record carriers one at a time in a desired sequence, and means for adjusting said adjustable means to adjust the position to which a record carrier is moved for cooperating with the turntable.

PAUL H. SMYTH, Jr.